June 19, 1956    L. E. MUELLER    2,751,003
SHEET FEEDER
Filed Nov. 30, 1953

INVENTOR.
LOUIS E. MUELLER
BY Whittemore,
Hulbert &
Belknap
ATTORNEYS

United States Patent Office 2,751,003
Patented June 19, 1956

2,751,003

SHEET FEEDER

Louis Ernest Mueller, Detroit, Mich.

Application November 30, 1953, Serial No. 394,980

20 Claims. (Cl. 164—21)

The present invention relates to a sheet feeder.

In the specific embodiment of the invention illustrated herein the sheet feeder is illustrated and described as a component part of a die cutting machine particularly adapted for die cutting individual sheets of cardboard with extreme rapidity and with high accuracy. However, the invention is not limited to a die cutter but may be embodied in apparatuses for carrying out different operations such for example as printing, embossing or the like.

In the past, in high production die cutting equipment including a bed having a cutter board, which may be a conventional steel rule die, secured thereon and movable relative to an impression roll, great difficulty has been encountered in insuring exact registration between the sheets of material to be die cut and the cutter board. In accordance with the present invention means are provided which serve the dual function of advancing separate sheets of material onto the cutter board and for maintaining the sheets in accurately located position on the cutter board until the sheet is engaged by an impression roll or the like.

It is accordingly an object of the present invention to provide a sheet feeder associated with a movable work support, which in this case is the steel rule die, movable relative to the work support to advance a work sheet onto the work support and provided with means insuring thereafter that the feeder advances the work sheet during movement of the work support so as to maintain accurate registration between the work sheet and the work support.

It is a further object of the present invention to provide feeder means adapted to insure exact registration between a reciprocable work support which comprises means for advancing a work sheet onto the work support to a position determined by engaging stops or abutments between the work support and the feeder, and means for thereafter advancing the feeder to follow the work support to maintain the abutments in engagement so as to maintain the work sheet in predetermined registration on the work support.

More specifically, it is an object of the present invention to provide a die cutter having a work supporting cutter board reciprocable horizontally beneath a cooperating impression roll, means supporting a stack of sheets above the cutter board in the retracted position of the cutter board, a sheet follower including reciprocable means movable generally in the same direction as the cutter board and including means for engaging and withdrawing the bottom sheet from the stack and moving it over the cutter board, and abutment means intermediate the cutter board and feeder limiting advance of the feeder relative to the cutter board, means for reciprocating the cutter board, and non-positive driving means for advancing the feeder to a position determined by engagement between the aforesaid abutment means and for thereafter urging the feeder forwardly to maintain the abutment means in engagement to thereby maintain a predetermined registration of the sheet on the cutter board.

Other objects and features of the invention will become apparent as the description proceeds, especially when taken in conjunction with the accompanying drawings, wherein.

Figure 2:
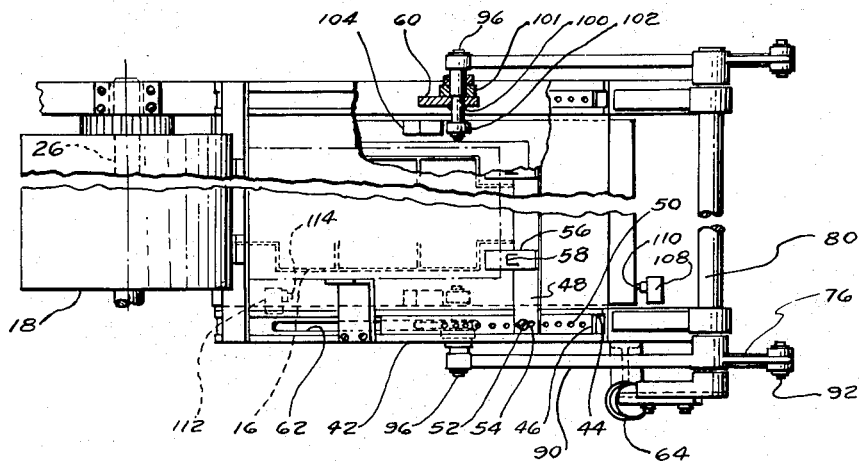
Figure 2 is a plan view of the apparatus shown in Figure 1 with the center portion omitted and with parts broken away.

Referring now to the figures, the apparatus comprises a main frame 10 having a bed 12 mounted thereon in suitable ways for longitudinal reciprocation. The bed 12 is designed to have a cutter board 14 secured thereto, the cutter board including cutting blades or knives 16 arranged in a predetermined pattern. Rigidly mounted on the frame 10 is an impression roll 18 adapted to be driven in rotation from a main drive gear 20 operating through an idler gear 22 to a roll gear 24 keyed or otherwise secured to the shaft 26 which supports the impression roll 18.

Means are provided for reciprocating the bed 12 in timed relation to the rotation of the impression roll 18 and this means comprises a bed drive gear 28 driven from the main drive gear 20 through pinion 29 and coacting with a rack 30 rigidly secured to the underside of the bed 12. From the foregoing it will be observed that as the bed advances to the left as seen in Figure 2, the impression roll 18 rotates clockwise and the gearing and parts are dimensioned so as to provide substantially rolling contact between the periphery of the impression roll and the upper surface of the blades or knives 16. The impression roll thereafter forces a sheet of material, such for example as board, cardboard or the like, against the blades or knives so as to cut the sheet into a pattern in accordance with the arrangement of blades or knives 16.

The apparatus as so far described may be considered as a typical or conventional die cutter. Suitable means, such for example as a reversible motor, are of course provided for driving the gear 20 forwardly and reversely to effect the required back and forth reciprocation of the bed 12 and rotation of the roll 18. In operation, the die cut piece may be removed from cutter board 14 manually while at the left of impression roll 18, as seen in Figure 2.

It will of course be obvious that instead of a die cutter, equivalent apparatus could be employed for printing sheet material mounted on a work support in the position of the cutter board or that by a proper design of roll and work support an embossing operation could be carried out.

In any case it is essential in many operations that the sheet of work material be positioned on the cutter board or work support with a high degree of accuracy. For example, in a familiar operation, the work sheet may be previously printed cardboard which is to be cut by the illustrated apparatus so as to permit it to be formed into a box, carton or the like. The printed material on the board will be registered accurately with reference to its outer dimensions and the problem is to provide a corresponding accuracy in the cutting operation with reference to the previously printed material.

Figure 1:
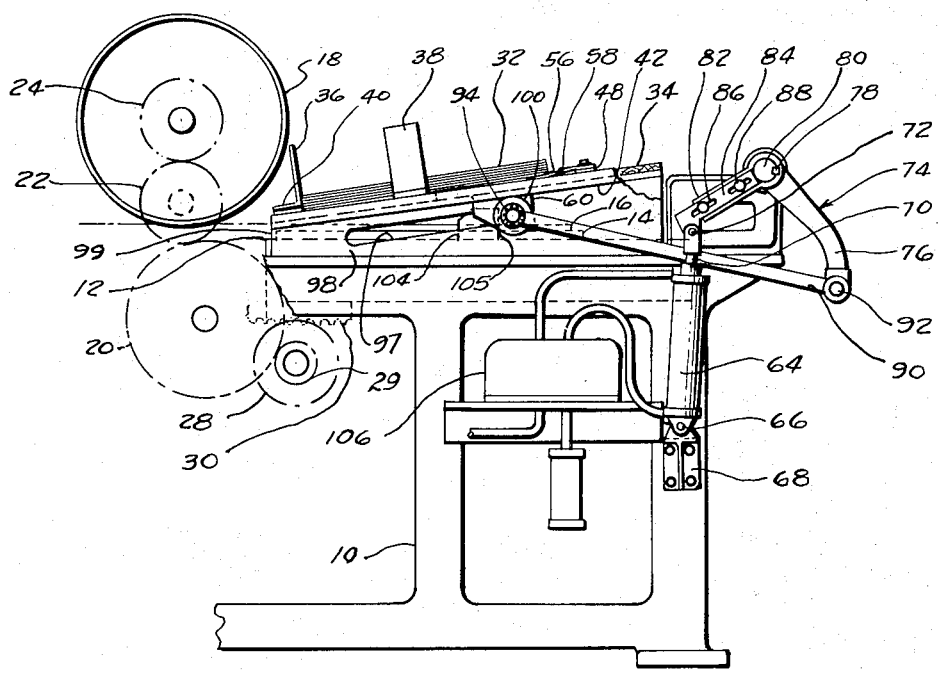
Figure 1 is a side elevation of die cutting apparatus including the sheet feeder, with parts broken away.

In accordance with the present invention a stack 32 of cardboard, which may be corrugated or otherwise, is supported on an inclined stock board 34 and is retained in aligned position thereon by guides indicated at 36 and 38 herein illustrated as in the form of angle brackets. As noted in Figure 1, the angle bracket 36 has its bottom flange 40 spaced upwardly from the upper surface of the stock board to permit movement of the bottom sheet of material to the left as seen in the figure.

At opposite sides of the machine there are provided longitudinally extending guide rails 42 having upwardly extending guide channels 44 in which are received longitudinally extending slide members 46. Extending between the slide members 46 is a feed bar 48 having its ends adjustably secured to the slide members 46. Any suitable means for effecting adjustment of the feed bar longitudinally of the slide members may be employed. Thus for example, and as best illustrated in Figure 2, the slide bars or members may be provided with a series of tapped openings 50 adapted to receive clamp screws 52 and the ends of the feed bar 48 may be provided with elongated slots 54 through which the clamp screws 52 extend. By this means the feed bar may be adjusted a substantial distance longitudinally of the slide bars by shifting the clamp screws 52 from hole to hole and fine adjustment of the feed bar may be obtained by virtue of the elongated slots 54 provided therein. The feed bar 48 is provided with a plurality of feed fingers 56 including shallow feeding elements 58 extending above the surface of the fingers 56 a distance somewhat less than the thickness of the individual sheets in the stack 32.

The slides 46 each include a downwardly extending bracket 60 welded or otherwise secured thereto. The guide rails 42 are provided with elongated slots 62 through which the brackets 60 extend.

Means are provided for effecting longitudinal movement of the slide bars 46 and the transversely extending feed bar and this means is non-positive in character for a purpose which will subsequently be described. As illustrated herein, the means for reciprocating the feed bar comprises a cylinder 64 pivoted as indicated at 66 to a bracket 68 mounted on the frame of the machine. Within the cylinder 64 is a piston connected to a piston rod 70 having a pivot connection 72 to a bell crank indicated generally at 74. Specifically, the bell crank comprises an arm 76 keyed or otherwise secured as indicated at 78 to a cross shaft 80. Also keyed or otherwise secured to the shaft 80 is an arm member 82 carrying a longitudinally adjustable member 84 which is pivotally connected to the piston rod by the pivot means indicated at 72. Elongated slots 86 are provided in the member 84 and clamping screws 88 extend through these slots into the arm 82, whereby the effective length of the arm of the bell crank mechanism may be adjusted. A link 90 is pivoted at one end as indicated at 92 to the arm 76 and is pivotally connected as indicated at 94 to a stub shaft 96. The stub shaft 96 extends through an inclined elongated slot 97 provided in the web 98 of the brackets 99 which support the guide rails 42. The stub shaft 96 as illustrated at 100, is welded or otherwise secured to the bracket 60. Mounted on the stub shaft 96 is a roller 101 which as best seen in Figure 2, engages under the guide rails 42, thus preventing the link 90 from lifting the slide members 46 from the channels in the guide rails. Carried by the stub shaft 96 at the inner ends thereof are abutments preferably in the form of rollers 102 which are engageable with rigid abutment blocks 104 extending upwardly from the bed 12. The abutment blocks 104 are provided with vertically extending flat surfaces 105 engageable by the rollers 102. This is to accommodate engagement between the abutment rollers 102 and the abutment blocks 104 while the blocks are movable horizontally with the bed and the abutment rollers 102 are movable along an incline as determined by the inclination of the guide rails 42.

The direction of admission of air to the operating cylinder 64 is controlled by an operating valve indicated diagrammatically at 106 and means are provided for controlling the operation of the valve 106 in timed relation to back and forth reciprocation of the bed 12. For this purpose there is provided a limit switch 108 having an actuating button 110 adapted to be engaged by the right hand end of the bed as seen in Figure 2 when the bed reaches its right hand position. A second limit switch 112 is provided having an actuating button 114 engageable by a portion of the sheet feeder to limit movement thereof to the left as seen in the figures. Limit switches 108 and 112 reverse the direction of air in the cylinder so that as the bed and the cutter board carried thereby move to the left beneath the impression roll, the feed bar is also moved to the left. The arrangement is such that as the bed approaches the right hand position as seen in these figures, the switch 108 is operated and air is admitted to the cylinder 64 in a direction tending to rock the bell crank 74 clockwise and to move the sheet feeder to the left as seen in these figures. The capacity of the piston and cylinder device is such that the mechanism tends to advance the sheet feeder at a rate faster than the rate of movement of the bed. Accordingly, the sheet feeder advances beneath the stack of sheets and the elements 58 pick up the sheet at the bottom of the stack and move it outwardly from beneath the stack to the left into position over the table, or more specifically, over the cutting knives or blades on the cutter board. Movement of the sheet feeder to the left advances the abutment rollers 102 into engagement with the adjacent surfaces of the abutment blocks 104 carried by the bed, thereby limiting advance of the sheet feeder to the left. When the abutment rollers 102 are in engagement with the adjacent surfaces of the abutment blocks 104 it will be obvious that the sheet which is being advanced by the edge engaging elements 58 will be in a very definitely predetermined registered position on the work supporting means carried by the bed. As the bed moves to the left the piston and cylinder mechanism urges the sheet feeding mechanism to the left at a rate greater than the rate of movement of the bed so that the abutment rollers 102 are maintained at all times in accurately located engagement with the abutment blocks 104. Inasmuch as the means for advancing the sheet feeder is independent of the means for reciprocating the bed, it is necessary that non-positive actuating means be employed for effecting movement of the sheet feeder. It is for this reason that an air cylinder is preferred. It will be appreciated however, that instead of an air cylinder, any type of fluid piston and cylinder device, including an hydraulic system, could be employed. Obviously, other means could be employed. The essential requirement is that the sheet feeder be urged to follow the table or work support in a manner to maintain abutting engagement between the abutting rollers thereon and the cooperative abutment blocks on the bed.

As soon as the leading edge of the sheet advanced by the sheet feeder has been engaged by the impression roll, it is no longer necessary for the feeder to follow the bed since registration of the sheet on the work supporting means is insured by engagement therewith of the impression roll. Accordingly, at this time and while the bed continues to move to the left, the limit switch 112 may be actuated thus reversing the direction of air to the cylinder 64 and returning the sheet feeder to its initial position.

Figure 3:
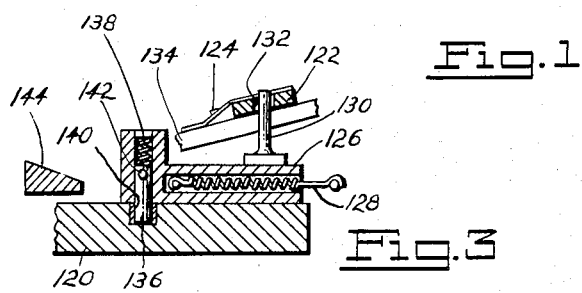
Figure 3 is a diagrammatic view illustrating another manner of carrying out the present invention.

In Figure 3 there is illustrated diagrammatically another mode of carrying out the present invention. Instead of employing driving means for the sheet feeder which is independent of the drive means for the bed or work support, accurate locator means may be provided to interconnect the bed and sheet feeder during initial forward movement of the bed so as to carry a sheet or work piece into engagement with the roll while maintained in accurate position on the work supporting means. In this figure a portion of the bed is illustrated at 120. It will be understood that this bed may be identical with that illustrated in Figures 1 and 2, and is provided with means for reciprocating it relative to the impression roll. In this figure the feeder bar is illustrated at 122 and may be identical with the feeder bar illustrated in Figures 1 and 2 and provided with sheet engaging means 124. Mounted on the frame of the machine is a slide 126 movable horizontally in parallelism with the bed 120 and it may be provided with suitable means such for example as the spring diagrammatically illustrated at 128 for returning it to its right hand position. Mounted on the slide are vertical pins 130 movable through vertically disposed openings 132 in the feeder bar 124 and adapted to drive the feeder bar along its inclined path over the stock board 134. Carried by the slide 126 is one or more pins 136 provided with suitable means such as compression springs 138 for urging the springs downwardly. In the upper surface of the bed 120 openings 140 are provided for the reception of the pins. Extending laterally from the locator pins 136 are release pins 142 adapted to be engaged by inclined cam surfaces 144 after a predetermined forward movement of the slide 126. It will be obvious that as soon as the pins 136 are retracted, the spring means 128 will return the slide 126 to the right, thus positioning the feeder bar 122 for its next feeding operation.

Obviously, instead of spring means 128, other means may be employed for returning the slide 126 to the right. The essential feature is that during forward movement of the bed 120 (and the steel rule die carried thereby) the feeder bar is positively locked in extremely accurately located position relative thereto so as to cause a sheet engaged by the feeding means to be in accurately located position on the die.

In all cases, the feeder mechanism is returned to its initial position before completion of a reciprocation of the bed, thus allowing sufficient time for the stock to settle into position for proper feeding of the lowermost sheet during the next advance of the stock feeding means.

Apparatus of the type disclosed herein is designed for high production operation and accordingly the bed is reciprocated rapidly back and forth. The reciprocation of the bed, as previously described, is employed to initiate a feeding operation of the feeder mechanism which advances a single sheet from the bottom of the stack into accurately registered and aligned position on the work support carried by the bed and which returns to its initial position as soon as the sheet has been guided into engagement with the impression roll.

The present invention depends for its successful operation upon the use of sheet feeding mechanism movable in substantially parallelism with a reciprocable work supporting member and the employment of abutment means intermediate the work support and sheet feeder to permit the sheet feeder to advance a sheet into accurately registered position on the work support and to thereafter maintain it in such accurately located position as long as necessary, after which the sheet feeder is retracted to position to feed a second sheet onto the work support at the appropriate time.

The drawings and the foregoing specification constitute a description of the improved sheet feeder in such full, clear, concise and exact terms as to enable any person skilled in the art to practice the invention, the scope of which is indicated by the appended claims.

What I claim as my invention is:

1. Apparatus for obtaining precise registration of a work piece in an operation performed thereon by a pair of relatively movable members, one of which members is a movable work supporting member, positive drive means for moving said work-supporting member from an idle position through a working stroke and return, non-positive feed means for advancing a work piece onto said work supporting member during its initial movement in the working stroke, and rigid locator abutment means between said work supporting member and said feed means to limit advance of a work piece to a predetermined position on said work supporting member.

2. Apparatus as defined in claim 1 in which said work supporting member is a reciprocable bed, and the other of said pair of members is a roll rotatable against a work piece carried by said bed.

3. Apparatus as defined in claim 2 in which the operation is a cutting operation and one of said members includes cutting knife edges.

4. Apparatus for working a series of sheets which comprises a support for a stack of sheets, an impression roll adjacent said support, a bed movable beneath said roll in position to cause said roll to press against a sheet on said bed, a feeder movable above and in parallelism with said bed and having means thereon engageable with the bottom sheet of the stack to withdraw said bottom sheet and advance it onto said bed, abutment means between said bed and feeder to limit advance of said feeder relative to said bed to a position in which said sheet is accurately registered therewith, means for reciprocating said bed, and non-positive drive means for advancing said feeder to engage said abutment means and thereafter to further advance said feeder to maintain engagement between said abutment means until a sheet on said bed is engaged by said roll.

5. Apparatus as defined in claim 4 in which said bed includes die cutting knives thereon.

6. Apparatus as defined in claim 4 in which said non-positive drive means comprises a fluid motor.

7. Apparatus as defined in claim 4 in which said non-positive drive means comprises a pneumatic motor.

8. Apparatus as defined in claim 4 in which said non-positive drive means comprises a piston and cylinder device.

9. Apparatus as defined in claim 4 in which said feeder comprises slide means movable beneath the stack of sheets, elements on said slide means engageable with the edge of only the bottom sheet of the stack, and means for adjusting said elements relative to the part of said abutment means on said feeder to adjust the position of a sheet on said bed when said abutment means are engaged.

10. A die cutter comprising an impression roll, a bed reciprocable beneath said roll, a cutter board on said bed, a stock support over said bed and adjacent said roll, a stock feeder having an element thereon engageable with the lowermost sheet of a stack on said stock support, means supporting said feeder for reciprocation substantially parallel to the direction of reciprocation of said bed, means for reciprocating said bed and reversely rotating said roll in timed relation, non-positive drive means for advancing said feeder toward said roll during advance of said bed toward said roll, and abutment means carried by said bed and feeder, said non-positive drive means being operable to advance said feeder more rapidly than movement of said bed to bring about and maintain engagement between said abutment means to locate a sheet advanced by said feeder in accurately predetermined position on said cutter board until the sheet is engaged by said impression roll.

11. A die cutter as defined in claim 10 in which said non-positive drive means comprises a piston and cylinder device.

12. A die cutter as defined in claim 10 in which said non-positive drive means comprises an air operated piston and cylinder device.

13. A die cutter as defined in claim 10 which comprises control means operated by return of said bed to position under said stock support to initiate feeding movement of said feeder.

14. A die cutter as defined in claim 13 which comprises control means operated by advance of said bed to a position where a sheet on said cutter board is engaged by said impression roll to initiate return movement of said feeder.

15. A die cutter comprising an impression roll, a bed reciprocable beneath said roll, a cutter board on said bed, a stock support over said bed and adjacent said roll, a pair of guide rails at opposite sides of said stock support, slides in said guide rails, a feeder bar connected at its ends to said slides and slidable over said stock support and under the stock supported thereon, means for reciprocating said bed and reversely rotating said roll in timed relation, nonpositive drive means for advancing said slides toward said roll during advance of said bed toward said roll, and abutment means carried by said bed and slides, said non-positive drive means being operable to advance said slides more rapidly than movement of said bed to bring about and maintain engagement between said abutment means to locate a sheet advanced by said feeder bar in accurately predetermined position on said cutter board until the sheet is engaged by said impression roll.

16. Apparatus of the character described comprising a work supporting bed, means for reciprocating the bed, an impression roll located over the path of movement of the bed to engage a work sheet carried thereby, means for supporting a stack of work sheets in position over the path of movement of said bed, sheet feeding means including means for engaging the lowermost sheet of the stack and for advancing the lowermost sheet in position over the bed as the bed is traversed from a position adjacent the stack to a position underlying said roll, and rigid locator means directly connecting said sheet feeding means to said bed during initial movement of said bed to insure exact registration between a sheet engaged by said sheet feeding means and sheet supporting means on said bed.

17. Apparatus as defined in claim 16 in which said rigid locator means serves to connect said sheet feeder means to said bed to effect movement of said sheet feeder means toward said roll during initial movement of said bed.

18. Apparatus as defined in claim 17 which comprises release means for disengaging said rigid locating means during movement of said bed toward said roll, and means for returning said sheet feeder means to initial feeding position.

19. Apparatus of the character described comprising a stock board for supporting a stack of work sheets, sheet feeder means comprising a member engageable with the lowermost sheet of the stack, an impression roll adjacent said stock board, a bed reciprocable from a position beneath said stock board to and from a position beneath said impression roll, work supporting means on said bed, and means including rigid locator members acting directly between said sheet feeder means and said bed and engaged during initial movement of said bed from beneath said stock board toward said impression roll to insure accurate registration of a work sheet on the work support means carried by said bed until the work sheet is engaged directly between the work support means and impression roll.

20. Apparatus as defined in claim 19 which comprises means for effecting disengagement between said rigid locator means, and means for returning said sheet feeder means to initial position during continued movement of said bed in a direction from said stock board toward said impression roll.

References Cited in the file of this patent
UNITED STATES PATENTS

| | | |
|---|---|---|
| 2,151,703 | Kaplan | Mar. 28, 1939 |
| 2,424,678 | Collinson | July 29, 1947 |